US008950590B2

(12) United States Patent  
Coffin et al.

(10) Patent No.: US 8,950,590 B2
(45) Date of Patent: Feb. 10, 2015

(54) CYCLONIC FLOW SEPARATOR

(75) Inventors: Philippe Coffin, Pau (FR); Yves LeCoffre, La Tronche (FR)

(73) Assignee: Total SA, Courbevoie (FR)

( * ) Notice: Subject to any disclaimer, the term of this patent is extended or adjusted under 35 U.S.C. 154(b) by 411 days.

(21) Appl. No.: 13/516,179

(22) PCT Filed: Dec. 7, 2010

(86) PCT No.: PCT/FR2010/052638
§ 371 (c)(1),
(2), (4) Date: Jun. 14, 2012

(87) PCT Pub. No.: WO2011/073550
PCT Pub. Date: Jun. 23, 2011

(65) Prior Publication Data
US 2012/0248035 A1  Oct. 4, 2012

(30) Foreign Application Priority Data

Dec. 18, 2009  (FR) ...................................... 09 59254

(51) Int. Cl.
*B04B 1/00*  (2006.01)
*B04B 11/02*  (2006.01)
*B01D 17/038*  (2006.01)
*B01D 17/02*  (2006.01)

(52) U.S. Cl.
CPC .............. *B04B 1/00* (2013.01); *B01D 17/0217* (2013.01); *B04B 11/02* (2013.01)
USPC ........ 210/512.3; 210/787; 209/713; 209/715; 209/725; 55/447

(58) Field of Classification Search
USPC ............... 210/512.3, 787; 209/713, 715, 725; 55/447
See application file for complete search history.

(56) References Cited

U.S. PATENT DOCUMENTS

| 1,373,743 | A | | 4/1921 | Jones |
| 3,904,109 | A | | 9/1975 | Underwood |
| 4,443,331 | A | | 4/1984 | Julien Saint Amand |
| 4,702,837 | A | * | 10/1987 | Lecoffre et al. ............ 210/512.3 |
| 5,131,544 | A | | 7/1992 | Serres et al. |

(Continued)

FOREIGN PATENT DOCUMENTS

| FR | 2 592 324 | | 7/1987 |
| FR | 2 919 206 | | 1/2009 |
| WO | WO 2011073550 A1 | * | 6/2011 |

OTHER PUBLICATIONS

The Written Opinion for the International Searching Authority for PCT/FR2010/052638, mailed Apr. 27, 2011.*

(Continued)

*Primary Examiner* — David A Reifsnyder
(74) *Attorney, Agent, or Firm* — Patterson Thuente Pedersen, P.A.

(57) ABSTRACT

The invention relates to a separator of fluid medium components, said separator including, along one axis, a movable assembly that is rotatable around the axis. Said separator moreover includes an output device. The movable assembly includes a cylindrical separation chamber having an inner wall. The output device includes a second outlet and a first outlet that is farther than the second outlet from the axis. The output device includes a third outlet that is farther than the first outlet from the axis and is intended for extracting a third fluid component comprising solid particles. Said third outlet includes an edge that is near an inner wall of the separation chamber.

11 Claims, 5 Drawing Sheets

(56) References Cited

U.S. PATENT DOCUMENTS

| | | |
|---|---|---|
| 6,189,613 B1 | 2/2001 | Chachula et al. |
| 7,967,991 B2 * | 6/2011 | Lecoffre et al. ............ 210/512.3 |
| 2009/0026151 A1 | 1/2009 | Lecoffre et al. |

OTHER PUBLICATIONS

French Preliminary Search Report of FR Application No. 0959254, dated Jul. 16, 2010 (2 pgs.).

International Search Report of PCT Application No. PCT/FR2010/052638, dated Apr. 27, 2011 (3 pgs.).

* cited by examiner

CYCLONIC FLOW SEPARATOR

PRIORITY CLAIM

The present application is a National Phase entry of PCT Application No. PCT/FR2010/052638, filed Dec. 7, 2010, which claims priority from French Application Number 09 59254, filed Dec. 18, 2009, the disclosures of which are hereby incorporated by reference herein in their entirety.

FIELD OF THE INVENTION

The invention relates in general to a cyclonic flow separator for separating components of a fluid medium.

BACKGROUND OF THE INVENTION

One non-exclusive application of such a separator is in the production of petroleum oil. In this application, which is of particular interest to the inventors without this being considered as limiting, the separator is placed in an oil well for example. It receives a fluid comprising water and oil coming from an oil-producing reservoir, and extracts oil having a reduced water content. The water separated from the extracted oil is reinjected into a reservoir level, possibly different from the producing reservoir, without any need for it to be separated or processed in a topside facility. One variant is to separate the fluids in the well and bring them to the surface.

Cyclonic flow conditions in a chamber for separating the components of a fluid are particularly effective for separating the components by weight. At the outlet from the cyclonic flow separation chamber, the heavier components are collected at a radial position that is further from the center than the lighter components. In an ideal cyclonic flow, the tangential velocity of the particles in the fluid medium increases in a hyperbolic relationship from the periphery of the chamber to a radius where it reaches a maximum value, and then decreases between said radius and the center of the chamber in a linear relationship. It is zero at the center of the separation chamber. This subjects the particles of the fluid medium to radial accelerations in the hyperbolic zone that are inversely proportional to the cube of the radius.

Documents FR-A-2 592 324 and FR-A-2 919 206 describe separators for heterogeneous liquids having a cylindrical separation chamber and an axial impeller which rotate together around their common axis. The impeller has a core with guide channels around it that bring a fluid medium into the chamber in order to generate a cyclonic flow.

These separators allow separating two fluid components of the fluid medium. However, when the medium is also loaded with solid particles that are denser than the fluid components, these accumulate on the inner wall of the separation chamber, particularly near the downstream end of the separation chamber. This accumulation interferes with the cyclonic flow, and causes erosion of the downstream end of the separation chamber.

An object of the invention is to improve rotary-type cyclonic flow separators. In particular, removal of the solid particles from the fluid medium in the separation chamber is desired.

SUMMARY OF THE INVENTION

A cyclonic flow separator according to one embodiment of the invention comprises, along the axis:
a movable assembly comprising at least an impeller and a cylindrical separation chamber having an inner wall, said movable assembly being rotated around said axis to cause the fluid medium to flow in a substantially axial flow and the components of said fluid medium to separate, and
an outlet device at a downstream end of the separation chamber, comprising at least a first outlet for extracting a first fluid component and a second outlet for extracting a second fluid component that is less dense than the first fluid component, said first outlet being further from the axis than the second outlet.

The outlet device comprises a third outlet for extracting a third fluid component containing solid particles. The third fluid component is denser than the first fluid component, and the third outlet is further from the axis than the first outlet with at least one edge near the inner wall of the separation chamber.

Through these arrangements, the solid particles of the fluid medium form a thin layer on the inner wall of the separation chamber and advance longitudinally along this wall in the direction the fluid is flowing, towards the downstream end of the separation chamber, then are discharged by the third outlet. There is therefore little or no accumulation of the particles, and no interference with the operation of the cyclonic flow separator; the separation chamber has less wear.

As a variant, the separator comprises a bypass channel connecting the third outlet with the second outlet in the outlet device, so that the third fluid component flows towards the second fluid component.

Due to this arrangement, in a petroleum application, water loaded with solid particles is not reinjected in a level of the reservoir, which tends to clog this reservoir level. It is carried upward with the oil, then separated from the oil.

In some embodiments of the separator, one or more of the following arrangements may be used:

the separator additionally comprises a stationary outer envelope and first, second, and third channels each in a respective extension of the first, second and third outlets, for carrying each fluid component, wherein said third channel is part of an outer insert rotated with the movable assembly about the axis and empties into a stationary cavity of the outer envelope;

sealing means form a seal between the outer envelope and the outer insert comprising the third channel;

the sealing means comprises a sealing pad pressed against either the outer insert or outer envelope, by at least one elastic element;

the outer insert and the outer envelope are axially separated by a gap forming a discharge channel between the first outlet channel and the cavity;

the discharge channel has a cylindrical portion extending substantially parallel to the axis, comprising a plurality of radial flow restrictors to adjust the head loss in said discharge channel;

the third channel comprises at least a first diaphragm adapted so that the pressure of the third fluid component in said cavity is less than or equal to the pressure of the first fluid component in the first channel;

a bypass channel extends between the cavity and the second channel, such that the third fluid component flows towards the second fluid component;

the bypass channel comprises a second diaphragm adapted so that the pressure of the third fluid component in said cavity is greater than or equal to the pressure of the second fluid component in the second channel;

the third channel is divided into a plurality of subchannels between the third outlet from the separation chamber and the first diaphragm;

the outlet device forms a bottom to the separation chamber that is substantially transverse to the axis, comprising an annular protrusion extending upstream relative to the flow of the fluid in the separation chamber, said protrusion being positioned between the first outlet and the third outlet so that it channels the solid particles of the third fluid component towards said third outlet.

BRIEF DESCRIPTION OF THE DRAWINGS

Other features and advantages of the invention will be apparent from the following description of one of its embodiments, provided as a non-limiting example, with references to the attached drawings. In the drawings.

DETAILED DESCRIPTION OF THE DRAWINGS

The same references are used in the various figures to denote identical or similar elements.

Figure 1:
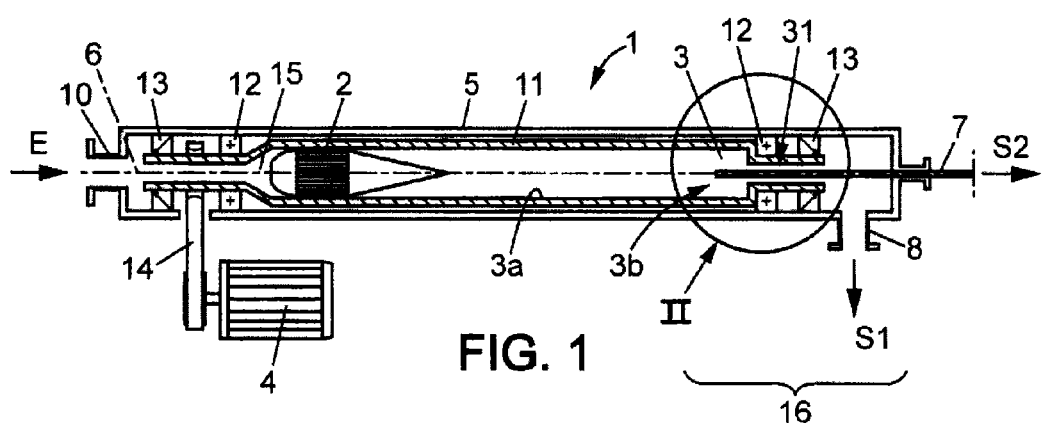
FIG. 1 is a schematic diagram showing a longitudinal cross-section of a separator of components of a fluid medium.

FIG. 1 shows a general view of an axial cross-section of an embodiment of a cyclonic flow separator. This example of a separator 1 contains a stationary outer envelope 5 that is generally cylindrical with an axis 6, comprising an inlet E for a fluid medium to be separated, a fluid outlet S1 and a fluid outlet S2. Inside the outer envelope 5, a cylindrical separation chamber 3 and a coaxial impeller 2 are assembled coaxially with the outer envelope 5 and pivot about the axis 6.

The chamber 3 and the impeller 2 are part of an assembly 11 pivotally mounted in the outer envelope 5 on bearings 12. The number and position of the bearings in FIG. 1 can vary. Dynamic seals 13 provide sealing between the movable assembly 11 and the stationary outer envelope 5. In the embodiment in FIG. 1, the movable assembly 11 is rotated by a belt 14 which is itself driven by a motor 4.

The inlet E, at an upstream end of the separator 1, is supplied via an axial coupling 10 with a pressurized flow of a fluid medium to be separated, such as a water-oil emulsion.

The outlet S1 is implemented in this embodiment by a lateral coupling 8 on the outer envelope 5 of the separator 1. This outlet S1 serves to deliver a first fluid component of a relatively high density captured at the outlet of the separation chamber 3, i.e. at its end remote from the impeller 2, distanced from the axis 6.

The outlet S2 in this embodiment is implemented by a tube 7 centered on the axis 6 and communicating with the inside of the separation chamber 3. This outlet S2 allows evacuating a second fluid component of a density lower than that of the first component.

In an oil production application, the first fluid component is water (having a residual oil content that is much lower than the oil content of the emulsion introduced at the inlet E), and the second fluid component is oil (having a residual water content much lower than the water content of the emulsion introduced at the inlet E).

After the inlet E, the fluid medium (water-oil) enters the movable assembly 11 by its upstream end, emerges into an upstream chamber 15, passes through the impeller 2 which converts the translational motion of the fluid into rotational motion about the axis 6 with a speed of rotation identical to that of the assembly 11, and is injected at the periphery of the separation chamber 3 with a tangential velocity substantially equal to that of the inner wall 3a of the separation chamber 3.

With this type of entry into the separation chamber 3, the tangential velocity of the fluid in the chamber 3 varies in a manner that is substantially inversely proportional to the radius, greatly increasing as the center, i.e. the axis 6, is approached. This leads to accelerations that are favorable to separating the fluids, and particularly to concentrating the second fluid component, of lower density than the first fluid component, towards the center of the separation chamber 3 during the flow.

The relatively dense first fluid component (water) is then discharged from the separation chamber 3 via an annular first outlet 21 at the downstream end of the chamber 3, which connects with the outlet S1 of the separator via an annular first channel 31. These elements can be seen more easily in FIG. 2 which is an enlarged view of the right-hand portion of FIG. 1. In an application in petroleum production, the water evacuated in this manner, which may have a very low residual oil content, is reinjected into the reservoir at a level that may be different from the level from which the emulsion mixture is taken for delivery to the inlet E of the separator.

Figure 2:
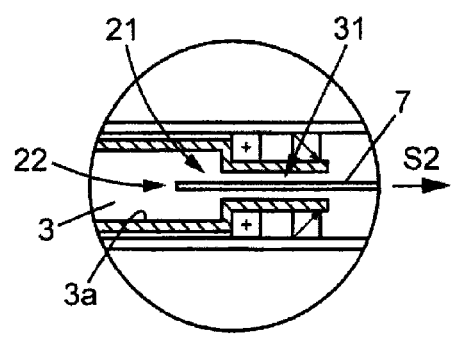
FIG. 2 is an enlarged longitudinal cross-sectional view of the outlet device of the separator of FIG. 1.

The second fluid component of relatively lower density (oil) is extracted via a second outlet 22 of the separation chamber 3, consisting in this example of a circular port in the central tube 7. This tube 7 in the embodiment of FIGS. 1 and 2 is secured to the outer envelope 5 of the separator and does not rotate with the separation chamber 3, which simplifies the construction of the device.

The tube 7, the first and second outlets 21, 22, and the lateral 8 and axial 10 couplings are an example of an outlet device 16 at a downstream end 3b of the separation chamber 3.

In another arrangement of the outlet device 16 of the separation chamber 3, these are both annular in shape and concentric with the axis of the chamber. Various arrangements are possible at the exit from the cyclonic flow separation chamber 3. In general, the outlets are concentric and the most dense component (water) is discharged at the outlet furthest from the axis while the lightest component (oil) is extracted at the outlet closest to the axis. In certain cases, a gas outlet (least dense phase and most central outlet) may be provided in addition to the outlets for water and oil.

Figure 3A:
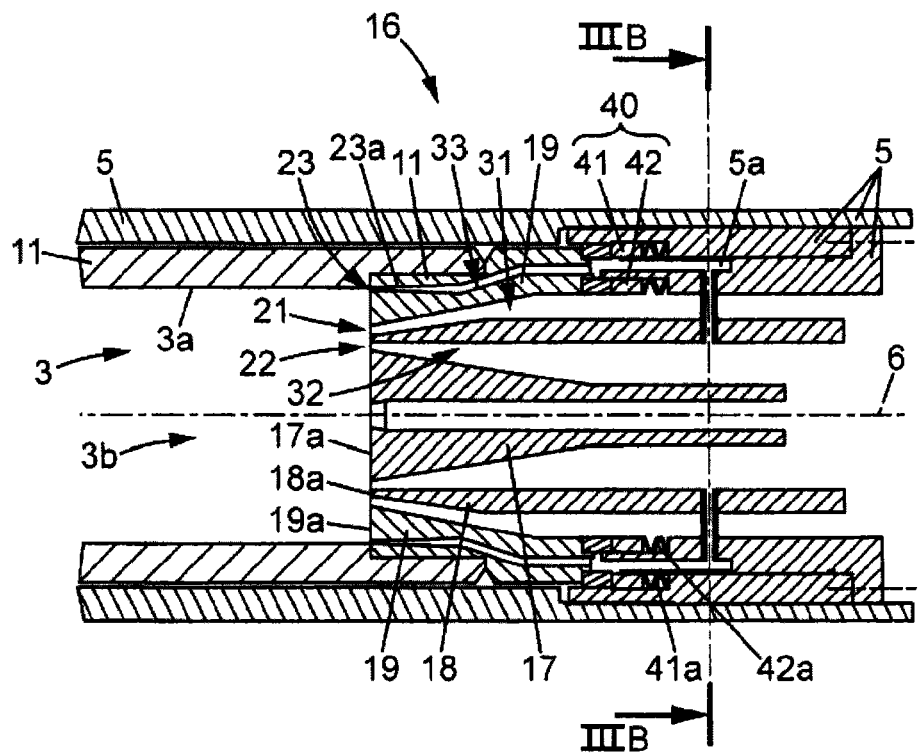
FIG. 3A is a longitudinal cross-sectional view of the outlet device in a first embodiment of the invention.
Figure 3B:
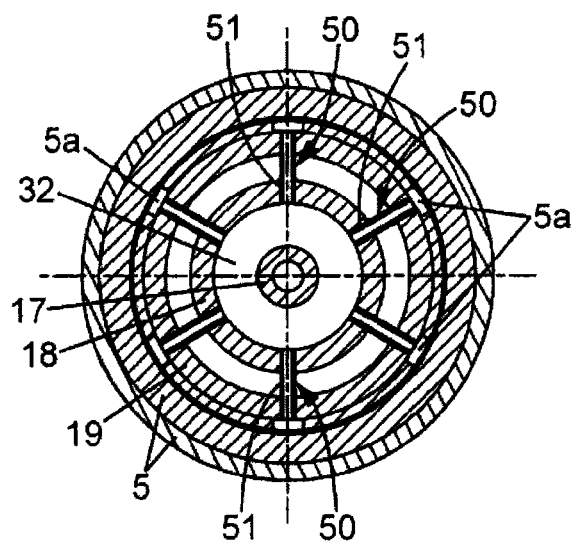
FIG. 3B is a transverse cross-sectional view of the device of FIG. 3A along the line IIIb.

FIGS. 3A and 3B show enlarged views of a first embodiment of an outlet device 16 of the invention. In this view, the separation chamber 3 comprises an annular first outlet 21 and an annular second outlet 22 surrounded by the first outlet 21.

The outlet device 16 additionally comprises:
  a central insert 17 extending in the direction of the axis 6 and comprising a substantially circular upstream face 17a centered on the axis 6,
  a substantially cylindrical intermediate insert 18, extending around the central insert 17 in the direction of the axis 6 and having an annular upstream face 18a surrounding the upstream face 17a, and a substantially cylindrical outer insert 19 extending around the intermediate insert 18 in the direction of the axis 6 and having an annular upstream face 19a surrounding the upstream face 18a.

The face 17a of the central insert 17 generates a dead zone in the separation chamber 3, in which the fluid medium does not move. This dead zone of fluid medium is substantially cylindrical and extends from the face 17a towards the inside of the separation chamber 3.

In FIG. 3A, the upstream face 18a of the intermediate insert 18 is not very thick in the radial direction perpendicular to the direction of the axis 6. It separates the first and second outlets (21, 22) of the separator, i.e. it separates the flows of the first fluid component (water) and the second fluid component (oil) of the fluid medium.

The upstream faces 17a, 18a and 19a of the outlet device 16 form the bottom of the separation chamber 3 at its downstream end 3b. The first, second and third outlets (21, 22, 23) are arranged between these upstream faces of the outlet device 16.

The central insert 17 is connected to the outer envelope 5 of the separator 1 by parts not represented in the figures, so that it does not rotate or is not rotated with the movable assembly 11.

The intermediate insert 18 is also connected to the outer envelope 5 of the separator 1, for example by radial bars extending between the central insert 17 and the intermediate insert 18. It therefore does not rotate or is not rotated with the movable assembly 11.

The outer insert 19 is connected to the movable assembly 11, for example by other radial bars extending between the outer insert 19 and the movable assembly 11. It is therefore rotated about the axis 6, but is stationary relative to the movable assembly 11.

A substantially annular space between the central insert 17 and the intermediate insert 19 forms a second extraction channel 32 in the extension of the second outlet 22 of the separation chamber, for extracting the second fluid component (oil).

A substantially annular space between the intermediate insert 18 and the outer insert 19 forms a first extraction channel 31 in the extension of the first outlet 21 of the separation chamber 3, for extracting the first fluid component (water).

A substantially annular space between the outer insert 19 and the mobile assembly 11 forms a third extraction channel 33 in the extension of the third outlet 23 of the separation chamber 3, for extracting the third fluid component containing solid particles (sand). Said third outlet 23 has an outer edge 23a having a diameter substantially equal to the inner diameter of the inner wall 3a of the separation chamber 3.

The solid particles of the third fluid component (sand) are thus rapidly discharged by the third outlet 23 of the outlet device 16. They do not accumulate in the separation chamber 3, do not interfere with the cyclonic flow of this chamber, and do not cause wear to the outlet device 16.

The outlet device 16 additionally comprises sealing means 40 between the stationary elements and the movable elements.

These sealing means 40 comprise:
  a first sealing pad 41 arranged between the movable assembly 11 and the stationary outer envelope 5, and
  a second sealing pad 42 arranged between the outer insert 19 and the stationary outer envelope 5.

These sealing means 40 prevent any escape of the third fluid component containing solid particles (sand) into the first fluid component (water) that is to be reinjected into the geological formation.

Each sealing pad 41, 42 is annular and is applied against the movable element by a respective elastic element 41a, 42a such as a Belleville washer or coil spring.

The third channel 33 therefore extends from the third outlet 23 of the separation chamber 3 to the sealing means 40, through the movable assembly 11 and/or the outer insert 19. This third channel 33 thus rotates about the axis 6 with the assembly 11. It opens into a cavity 5a of the envelope 5, which is stationary.

Next the third fluid component is guided towards the second channel 32 by at least one bypass channel 50. This bypass channel 50 is, for example, implemented as at least one radial tube 51 traversing the outer insert 19, the first channel 31, and the intermediate insert 18, to connect radially to the second channel 32.

The third fluid component containing solid particles (sand) is therefore diverted towards the second fluid component (oil).

Because of this arrangement, dense solid particles are carried with the second fluid component, oil, the light component of the fluid medium.

In addition, as represented in FIG. 3B, several tubes 51 may be arranged radially in a star around the axis 6.

Figure 4:
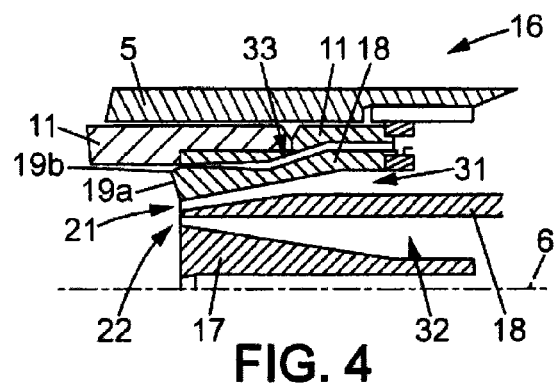
FIG. 4 is a view of the outlet device of a second embodiment of the invention.

FIG. 4 shows a second embodiment, reusing all the characteristics of the first embodiment of the outlet device 16. In this embodiment the upstream face 19a is not a flat surface substantially perpendicular to the axis 6. This upstream face 19a comprises an annular protrusion 19b extending inwards into the separation chamber 3.

Solid particles that are rotating are subjected to centrifugal force. When these solid particles are in contact with a rotating surface (the upstream face 19a), they are subjected to centripetal force as well.

Because of the protrusion 19b in this second embodiment, the solid particles of the third fluid component in contact with the upstream face 19a are prevented from moving towards the axis 6 along this upstream face 19a. The solid particles are therefore forced to flow towards the third outlet 23 and the third extraction channel 33.

Such a protrusion 19b can be adapted to all the other embodiments of the invention.

Figure 5:
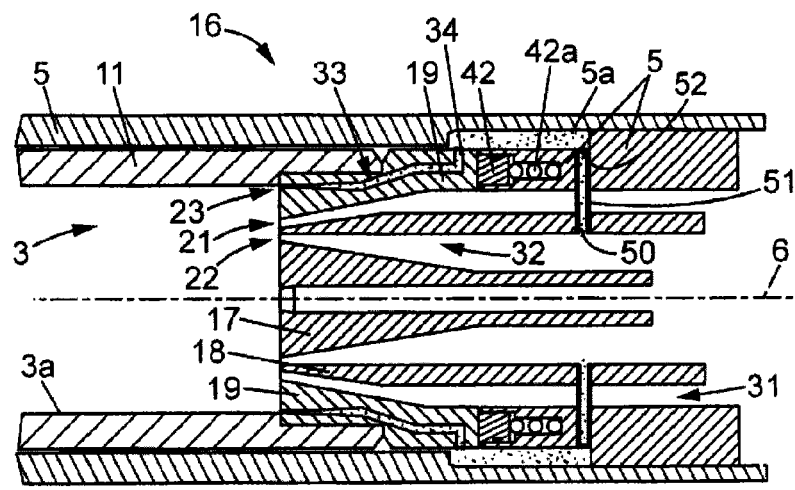
FIG. 5 is a view of the outlet device in a third embodiment of the invention.

FIG. 5 shows a third embodiment of the invention, comprising a single sealing pad 42 to form the seal between the stationary outer envelope 5 and the movable outer insert 19 which rotates about the axis 6. This simplified structure permits the use of a sealing pad of a larger cross section, which is more resistant to the high relative speeds between the outer envelope 5 and the outer insert 19.

The other aspects of this embodiment are identical to the embodiment in FIGS. 3A and 3B.

Figure 6:
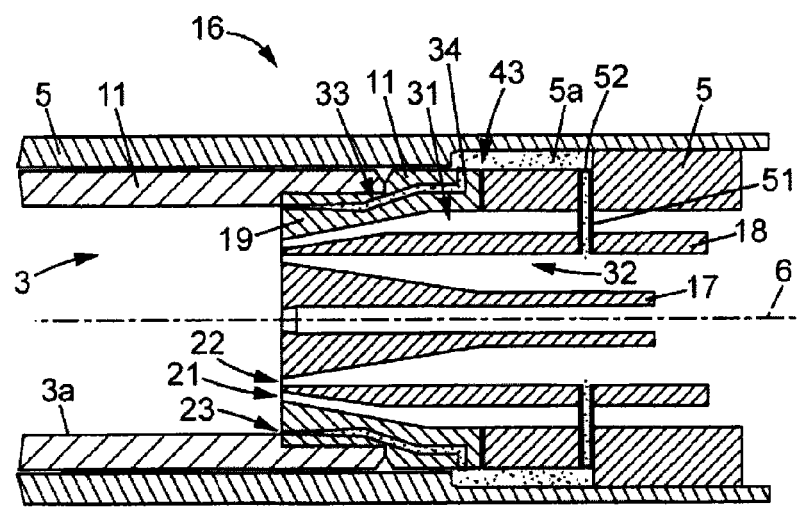
FIG. 6 is a view of the outlet device in a fourth embodiment of the invention.

FIG. 6 shows a fourth embodiment of the invention, in which the sealing means of the previous embodiments are replaced by an axial gap between the outer envelope 5 and the outer insert 19, forming a discharge channel 43 between the first channel 31 and the cavity 5a. In fact, the sealing pads 41, 42 must be sized to resist the relative speeds and the types of the fluid components, which is not easy in petroleum applications.

The outlet device 16 of this embodiment (but the other embodiments may also have this characteristic) comprises a first diaphragm 34 at the outlet from the third channel 33, meaning at the inlet to the cavity 5a.

Because of this first diaphragm 34, the pressure of the third fluid component in the cavity 5a may be less than or equal to the pressure of the first fluid component in the first channel 31. This ensures that in the discharge channel 43 a small amount of the first fluid component (water) of the first channel 31 is diverted to the cavity 5a, and that the third fluid component containing solid particles (sand) does not pass through this discharge channel 43 to the first channel 31. The first fluid component is therefore not contaminated and the outlet device 16 no longer needs a sealing pad or any other arrangement which establishes a contact seal.

The outlet device 16 of this embodiment (the other embodiments may also have this characteristic) also comprises a second diaphragm 52 at the inlet to the bypass channel formed by the tube 51, i.e. at the exit from the cavity 5a.

Because of this second diaphragm 52, the pressure of the third fluid component in the cavity 5a may be greater than or equal to the pressure of the second fluid component in the second channel 32. This ensures that the third fluid component is carried away by the bypass channel to the second channel 32.

The first and second diaphragms 34, 52 therefore allow adjusting the pressure in the cavity 5a, and therefore the flow rates into and out of this chamber. It is thus possible to ensure that these flow rates are sufficiently high to prevent the solid particles (sand) of the third fluid component from accumulating and clogging this cavity 5a.

Figure 7A:
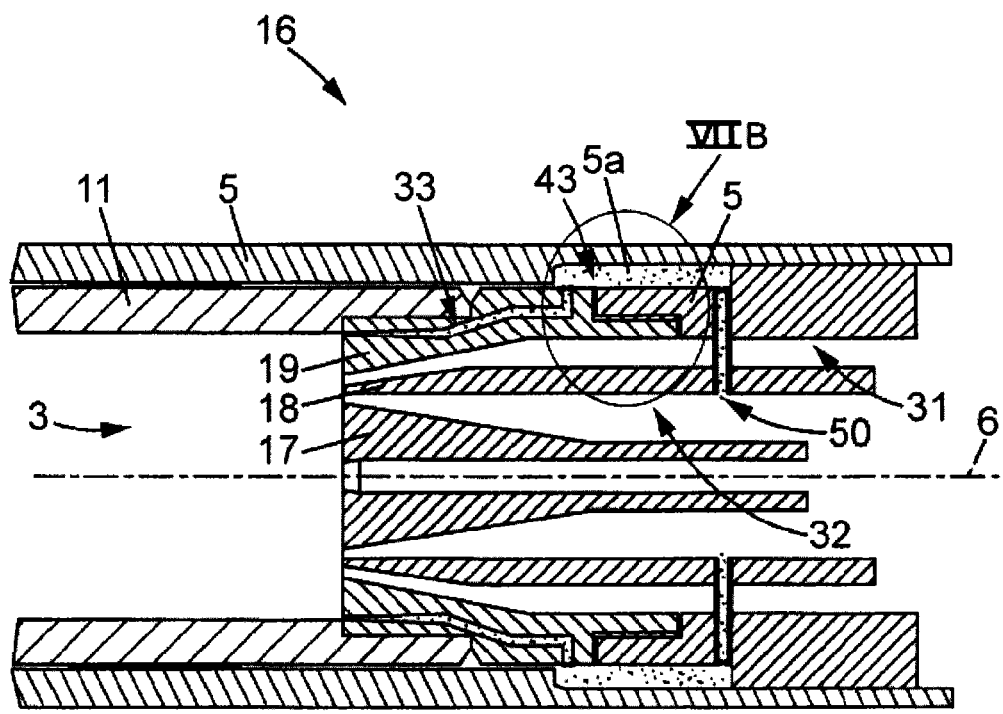
FIG. 7A is a view of the outlet device in a fifth embodiment of the invention.
Figure 7B:
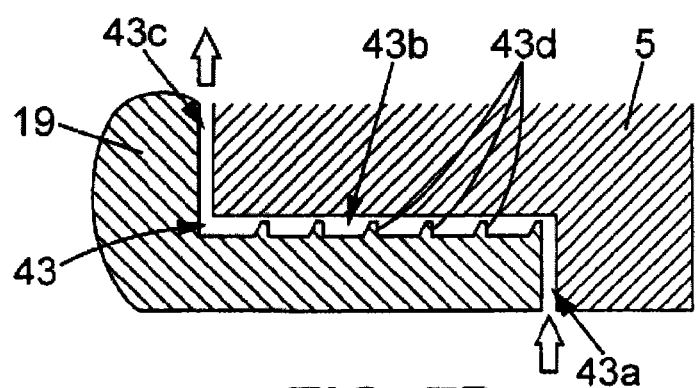
FIG. 7B is an enlarged view of a portion of FIG. 7A.

FIGS. 7A and 7B show a fifth embodiment of the invention, in which the discharge channel 43 of the fourth embodiment comprises an intermediate portion 43b that is substantially cylindrical longitudinally around the axis 6 of the device, between an inlet portion 43a and an outlet potion 43c that are substantially annular and radial.

The intermediate portion 43b possibly comprises a plurality of radial protuberances 43d extending transversely, forming radial flow restrictors in the discharge channel 43 and adapted to control the flow rate of the fluid passing through this discharge channel 43.

This intermediate portion 43b therefore allows adjusting the head loss and the flow rate in the discharge channel 43 without requiring large radial dimensions and without imposing axial tolerances that are difficult to apply in practice.

Figure 8:
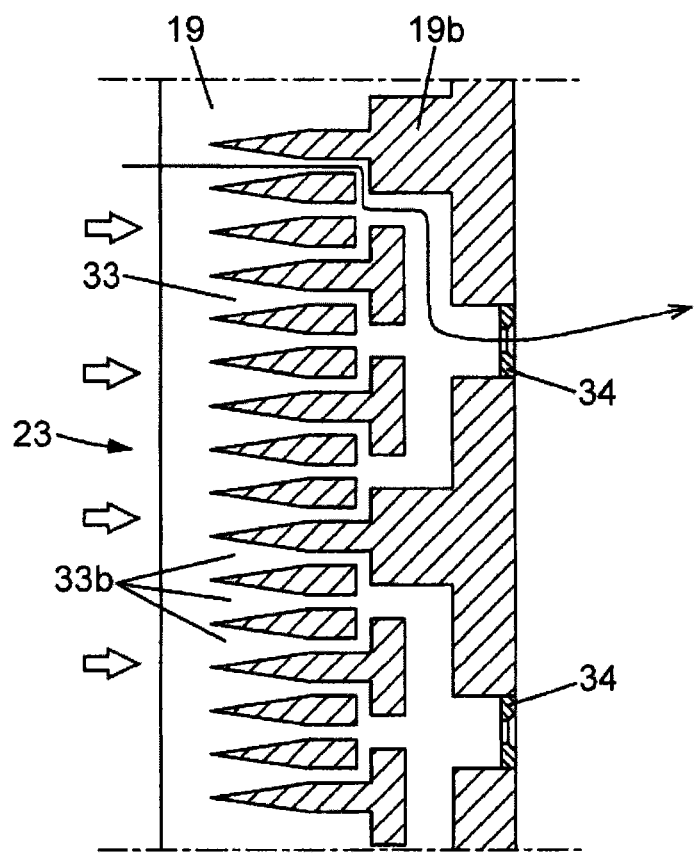
FIG. 8 is a planar cross-sectional view of an example of a third outlet of an outlet device of the invention.

FIG. 8 represents a planar schematic view of an example of substantially annular third channel 33 of the outlet device 16 of the invention. This third channel 33 comprises a plurality of subchannels 33b separated by the bars 19b connecting the outer insert 19 to the movable assembly 11. The inlets to these subchannels are convergent in shape to facilitate the flow and to prevent the solid particles (sand) of the third fluid component from accumulating in or clogging these inlets.

These subchannels then join back together before reaching the first diaphragms 34, which are followed by the cavity 5a.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A separator of components of a fluid medium, comprising, along an axis:
    a movable assembly comprising at least an impeller and a cylindrical separation chamber having an inner wall, said movable assembly being rotated around said axis to cause the fluid medium to flow in a substantially axial flow and the components of said fluid medium to separate, and
    an outlet device at a downstream end of the separation chamber, comprising at least a first outlet for extracting a first fluid component and a second outlet for extracting a second fluid component that is less dense than the first fluid component, said first outlet being further from the axis than the second outlet,
    said outlet device further comprising a third outlet for extracting a third fluid component containing solid particles, said third fluid component being denser than the first fluid component, and said third outlet being further from the axis than the first outlet with at least one edge near the inner wall of the separation chamber,
    wherein the separator additionally comprises at least one bypass channel connecting the third outlet with the second outlet in the outlet device, so that the third fluid component flows towards the second fluid component.

2. The separator according to claim 1, additionally comprising a stationary outer envelope and first, second, and third channels each in a respective extension of the first, second and third outlets, for carrying each fluid component, and wherein said third channel is part of an outer insert rotated with the movable assembly about the axis and empties into a stationary cavity of the outer envelope.

3. The separator according to claim 2, wherein sealing means form at least a seal between the outer envelope and the outer insert comprising the third channel.

4. The separator according to claim 3, wherein the sealing means comprise at least a sealing pad pressed against either the outer insert or outer envelope, by at least one elastic element.

5. The separator according to claim 2, wherein the outer insert and the outer envelope are axially separated by a gap forming a discharge channel between the first outlet channel and the cavity.

6. The separator according to claim 5, wherein the discharge channel has a cylindrical portion extending substantially parallel to the axis, comprising a plurality of radial flow restrictors to adjust the head loss in said discharge channel.

7. The separator according to claim 6, wherein the third channel comprises at least a first diaphragm adapted so that the pressure of the third fluid component in said cavity is less than or equal to the pressure of the first fluid component in the first channel.

8. The separator according to claim 7, wherein a bypass channel extends between the cavity and the second channel, such that the third fluid component flows towards the second fluid component.

9. The separator according to claim 8, wherein the bypass channel comprises at least a second diaphragm adapted so that the pressure of the third fluid component in said cavity is greater than or equal to the pressure of the second fluid component in the second channel.

10. The separator according to claim 7, wherein the third channel is divided into a plurality of subchannels between the third outlet of the separation chamber and the first diaphragm.

11. The separator according to claim 1, wherein the outlet device forms a bottom to the separation chamber that is substantially transverse to the axis, comprising an annular protrusion extending upstream relative to the flow of the fluid in the separation chamber, said protrusion being positioned between the first outlet and the third outlet so that it channels the solid particles of the third fluid component towards said third outlet.

* * * * *